United States Patent
Rohde

(10) Patent No.: US 12,112,119 B2
(45) Date of Patent: Oct. 8, 2024

(54) SYSTEMS AND METHODS FOR CONTEXTUAL SUMMARIZATION IN AN ONLINE CONVERSATION CHANNEL

(71) Applicant: Salesforce, Inc., San Francisco, CA (US)

(72) Inventor: Sönke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 10 days.

(21) Appl. No.: 17/589,487

(22) Filed: Jan. 31, 2022

(65) Prior Publication Data

US 2023/0297761 A1    Sep. 21, 2023

(51) Int. Cl.
*G06F 40/106* (2020.01)
*G06F 3/04817* (2022.01)
(Continued)

(52) U.S. Cl.
CPC ........ *G06F 40/106* (2020.01); *G06F 3/04817* (2013.01); *G06F 3/04847* (2013.01); *G06F 40/137* (2020.01); *G06F 40/166* (2020.01); *G06N 3/08* (2013.01); *G06V 30/10* (2022.01); *H04L 51/216* (2022.05); *H04L 51/42* (2022.05)

(58) Field of Classification Search
CPC .................. G06F 40/106; G06F 40/137; G06F 40/166–186; G06F 3/048; G06F 3/04817; G06F 3/04847; G06F 16/34–345; G06V 30/10–387; H04L 51/42; H04L 51/216; G06N 3/02–105; G06N 3/08–0985
See application file for complete search history.

(56) References Cited

U.S. PATENT DOCUMENTS

| | | | |
|---|---|---|---|
| 2004/0083265 A1* | 4/2004 | Beringer | G06Q 10/10 709/204 |
| 2005/0114781 A1* | 5/2005 | Brownholtz | G06F 3/0482 715/713 |

(Continued)

OTHER PUBLICATIONS

Mike M. Live Streaming Emoji Cloud. Medium.com. Jun. 17, 2017. <https://medium.com/elobump/emoji-wordcloud-a168792695e3> ( Year: 2017).*

*Primary Examiner* — Liang Y Li

(74) *Attorney, Agent, or Firm* — Haynes and Boone, LLP

(57) ABSTRACT

Embodiments described herein provide a contextual conversation summarization mechanism on a chat platform. Specifically, a communication interface receives a first conversation line originated from a first user and a second conversation line originated from a second user. The mechanism then determines that the first conversational line and the second conversational line belong to a same conversation channel based on a channel indicator. The first conversation line and the second conversation line are concatenated as an input to a summarization model. The summarization model then generates a summary of the conversation channel associated with a timestamp. A first visualization element representing a first conversation contribution by the first user and a second visualization element representing a second conversation contribution by the second user are generated based on the generated summary. A user interface visualization of the summary is generated using the first visualization element and the second visualization element.

19 Claims, 16 Drawing Sheets

(51) Int. Cl.
*G06F 3/04847* (2022.01)
*G06F 40/137* (2020.01)
*G06F 40/166* (2020.01)
*G06N 3/08* (2023.01)
*G06V 30/10* (2022.01)
*H04L 51/216* (2022.01)
*H04L 51/42* (2022.01)

(56) References Cited

U.S. PATENT DOCUMENTS

| | | | |
|---|---|---|---|
| 2008/0192302 A1* | 8/2008 | Rohall | H04L 51/216 |
| | | | 358/402 |
| 2009/0265430 A1* | 10/2009 | Bechtel | H04L 67/535 |
| | | | 709/205 |
| 2012/0290289 A1* | 11/2012 | Manera | G06F 40/30 |
| | | | 704/9 |
| 2014/0245178 A1* | 8/2014 | Smith | H04L 51/216 |
| | | | 715/753 |
| 2017/0126594 A1* | 5/2017 | Chudge | H04L 51/216 |
| 2019/0205464 A1* | 7/2019 | Zhao | G06Q 10/107 |
| 2021/0320811 A1* | 10/2021 | Constantinides | G06Q 10/103 |

* cited by examiner

*FIG. 6A*

SYSTEMS AND METHODS FOR CONTEXTUAL SUMMARIZATION IN AN ONLINE CONVERSATION CHANNEL

CROSS REFERENCES

This application is related to co-pending and commonly owned U.S. application Ser. No. 17/589,444, filed on Jan. 31, 2022, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to applications of textual summarization and more specifically to systems and methods for contextual summarization in an online conversation channel of a multi-tenant system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Online chat platform and/or message board applications have been widely used for users to share their thoughts on various topics. At times, users may be interested in reviewing and tracking the conversation content. However, conversation data can be largely scattered and voluminous for manual review. Existing systems may allow a user to search through textual conversation data based on key terms to access certain relevant conversation lines. Or some applications may provide a hashtag "#" function so that a user may review a series of conversation data of a certain topic under the hashtag. In these existing chat systems, however, even if a user is able to access or search through for conversation texts under a desired topic that has been designated under the hashtag, information presented to the user is still rather scattered and disorganized. The user still needs to spend significant time and efforts to manually review a large amount of conversation texts.

Therefore, there is a need for a more efficient mechanism for a user to obtain information from raw conversation texts.

BRIEF DESCRIPTION OF THE DRAWINGS

FIGS. 6A-6E are simplified diagrams illustrating example user interface widgets for providing visualized conversation summaries, according to some embodiments.

Figure 1:
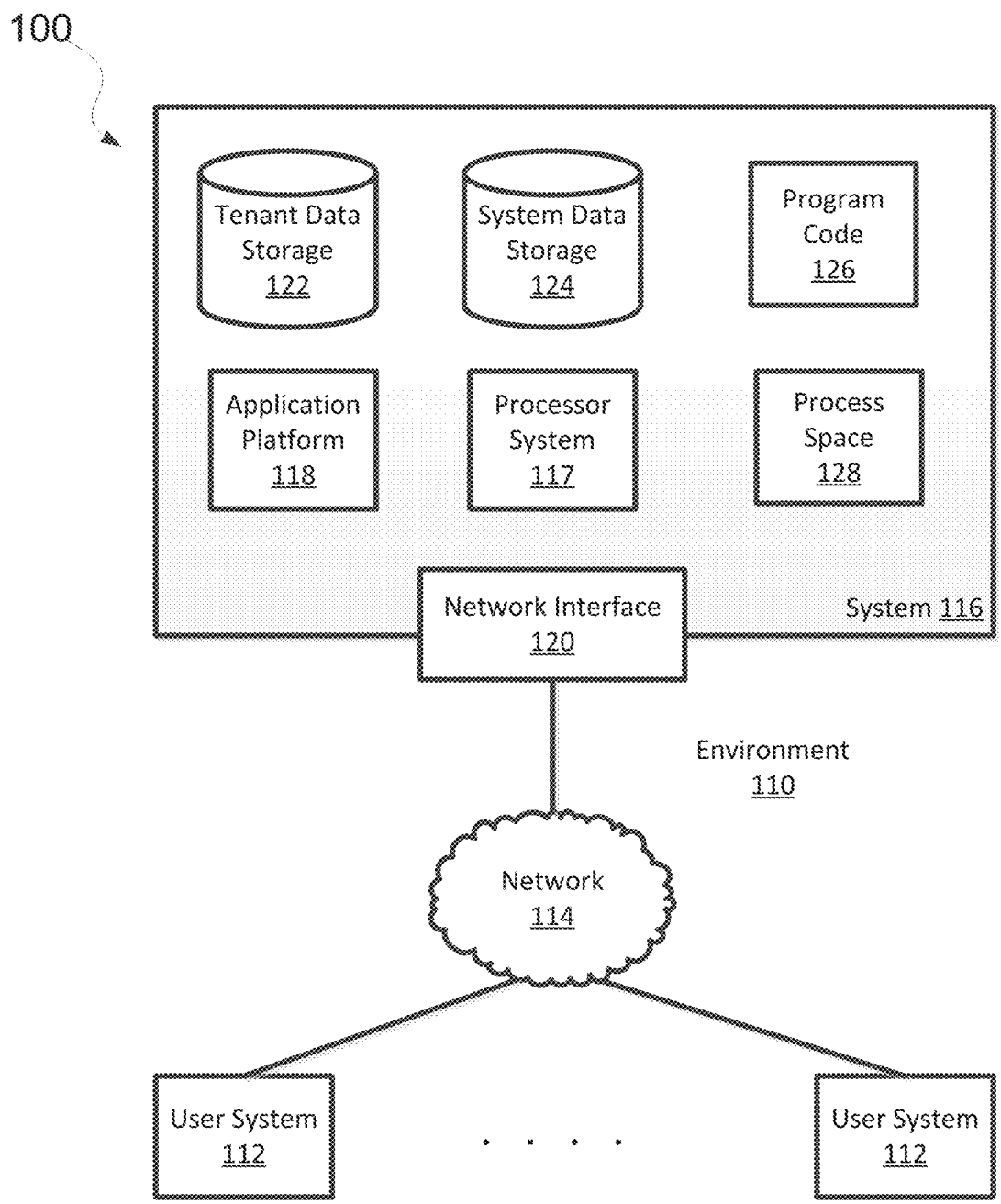
FIG. 1 illustrates a block diagram of an example environment wherein systems and methods for contextual summarization in an online conversation channel of a multi-tenant system may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "conversation" may be used to refer to any audio, textual communication in any other media form. For example, the conversation may include a shared post on an online platform, a real-time dialogue, and/or the like.

As used herein, the term "channel" may be used to refer to a communication group on a communication platform for conducting conversations relating to certain topics associated with the communication group.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

In view of the need for efficient mechanism for a user to obtain information from raw conversation texts, Embodiments described herein provide a contextual conversation summarization mechanism on a chat platform. Specifically, when users are sharing posts via a conversation channel on the platform, a summarization system may track the natural language posts in real time and progressively generate summaries of the chats. The system may identify the user identities, action items and other entities in the conversation to generate the summary. For example, for a conversation clip: "Steve, can you present at 10 AM tomorrow?" "Yes, I'm ready." The mechanism generates a summary that "Steve confirms with Amy that he will present at 10 AM on 10/22." In this way, discussion among users may be reviewed in a more efficient manner.

In one embodiment, the system may generate personalize summary for different users on the same conversation channel. For example, even within the same conversation channel of a specific work group, for users having different roles in the group, the generated summary may vary depending on user preferences implied on their respective roles, user specified parameters, and/or heuristics from user activities.

In one embodiment, the system may generate various visualization elements to present the conversation summary, such as but not limited to a cluster of profile photo icons representing engagements of users in the conversation, a cluster of emojis used in the conversations representing the sentiments of the conversation, a compilation of visual elements in a tree structure representing the intensity and evolution of user reactions and engagements in the conversation, and/or the like.

Example Environment

The system and methods of the present disclosure can include, incorporate, or operate in conjunction with or in the environment of a database, which in some embodiments can implemented as a multi-tenant, cloud-based architecture. For example, a multi-tenant cloud-based architecture may support an online communication platform on which multiple parties can communicate and share posts of texts, photos, videos and/or other media forms.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
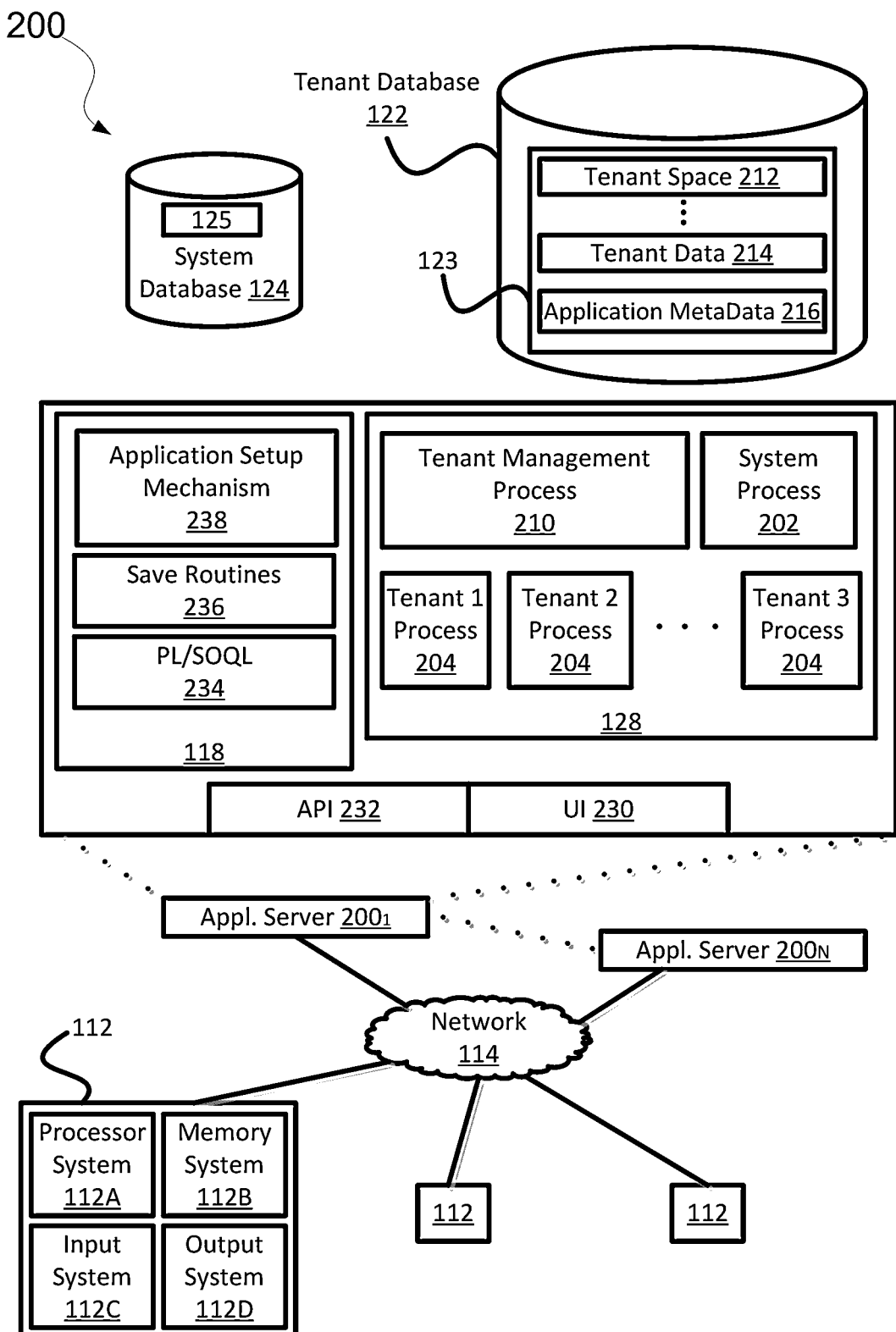
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, shortterm, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

According to some embodiments, in a multi-tenant database system accessible by a plurality of separate and distinct organizations, such as system 116 shown and described with respect to FIGS. 1 and 2, a conversation analytics module is provided for converting scattered conversation snippets and posts on the online conversation platform into summaries for analytics. The conversation analytics module may be installed or implemented at a computing device shown in FIG. 3.

Figure 3:
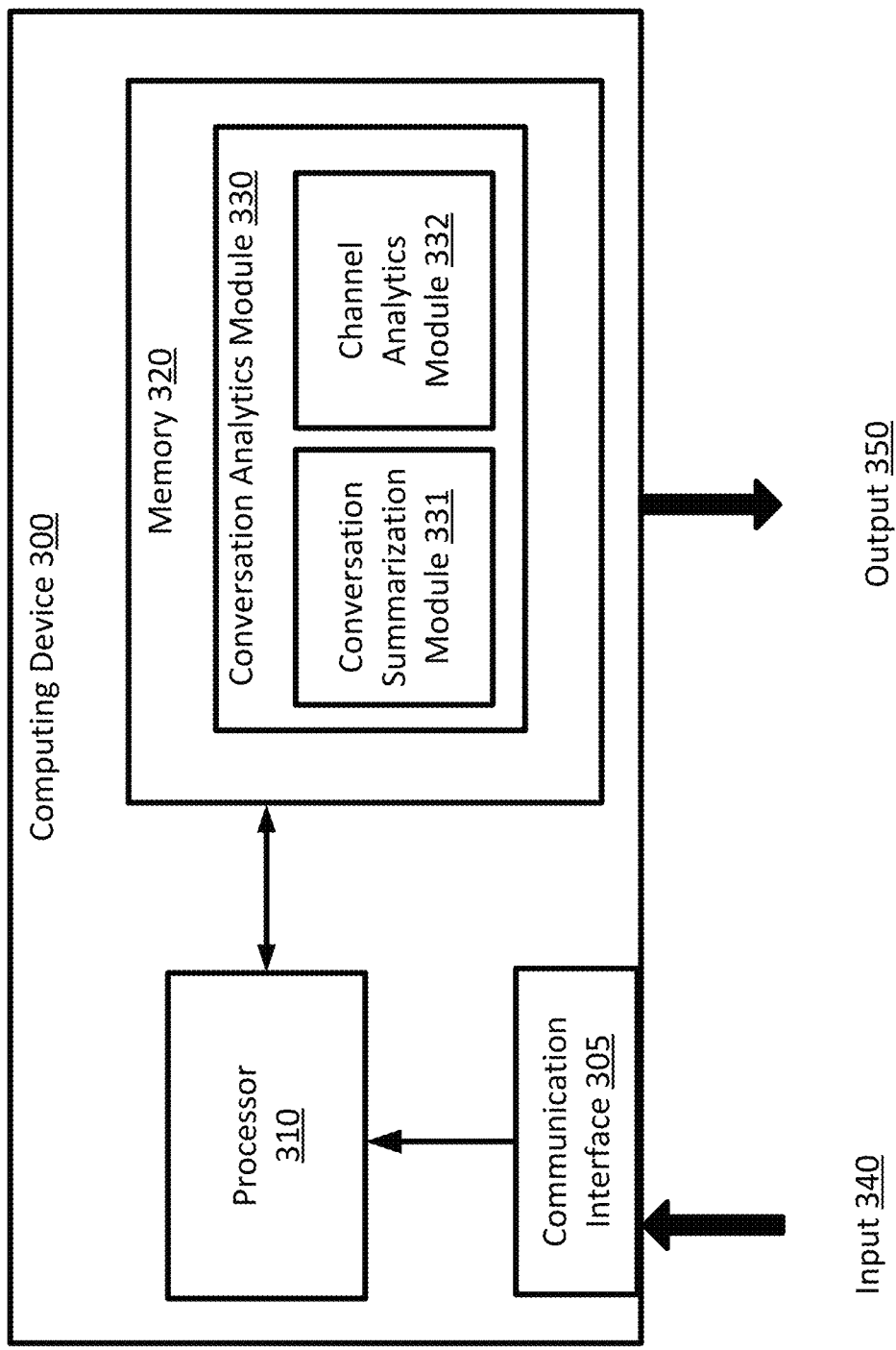
FIG. 3 is a simplified diagram of a computing device implementing contextual conversation summarization, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a conversation analytics module 330 for converting scattered conversation snippets and posts from input 340 on the online conversation platform into outputs 350 of summaries for analytics. For example, the input 340 may include conversation data from a channel including text messages, emojis, photos, user actions (e.g., "likes" or "dislikes"), charts, videos and/or other forms of media. Computing device 300 can receive the input 340 through a user interface, a communication interface 305 via a communication network, and/or the like.

The conversation analytics module 330 further includes sub-modules such as the conversation summarization module 331 and channel analytics module 332. Specifically, the conversation summarization module 331 may comprise a neural model for summarization, such as an abstractive or a generative summarization model. The conversation summarization module 331 is configured to collect threads of conversations on a conversation channel as input to the neural model, and generate a summary of the conversations, as further illustrated in FIG. 4. The channel analytics module 332 is configured to generate analytics of conversations on a channel via various visualized formats, as further illustrated in FIGS. 6A-12.

In one embodiment, the conversation analytics module 330 and its submodules 331-332 may be implemented through software, hardware and/or a combination of both.

Example Summarization Process

Figure 4:
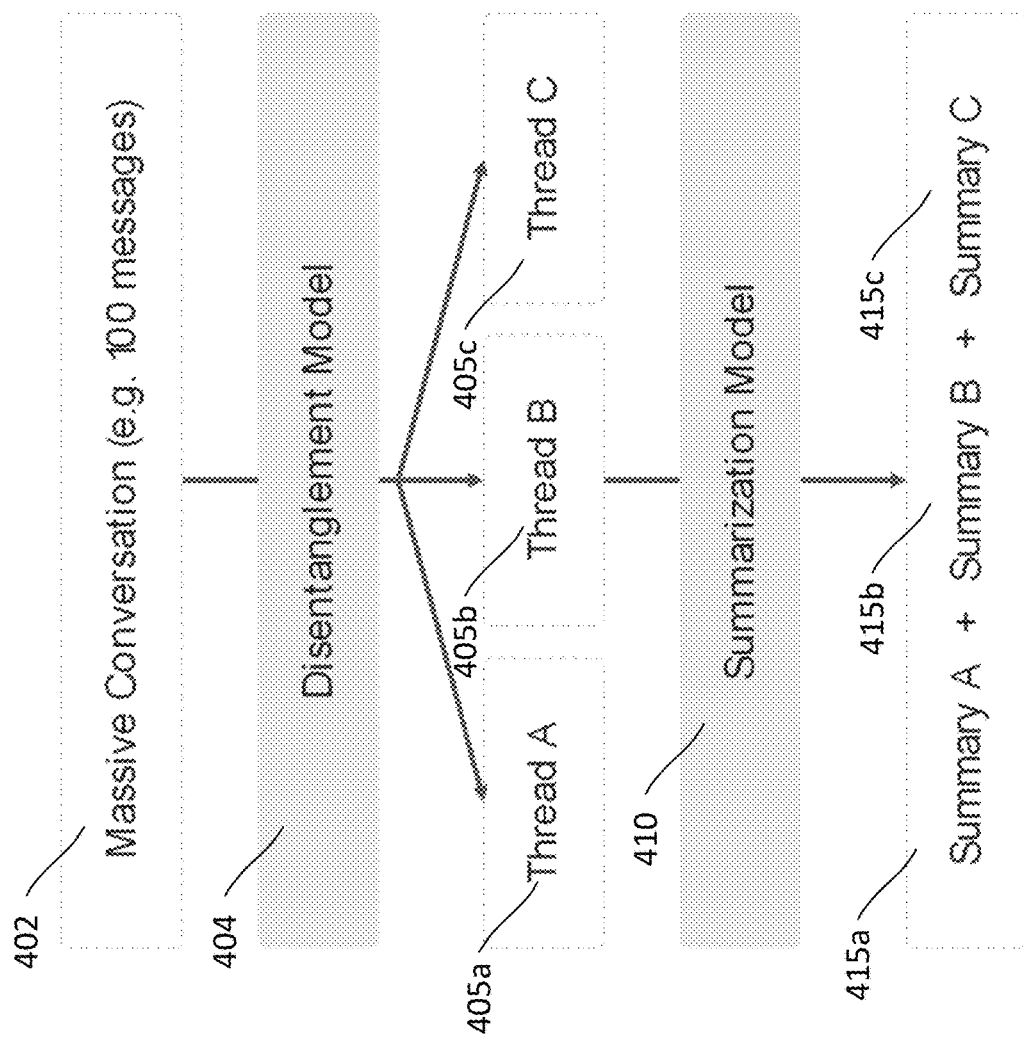
FIG. 4 is a simplified block diagram illustrating a structure of a conversation summarization framework, according to some embodiments.

FIG. 4 is a simplified block diagram illustrating a structure of a conversation summarization framework, according to some embodiments. FIG. 4 shows a disentangle model 404 and a summarization model 410, which may be implemented by the conversation summarization module 331 shown in FIG. 3. Specifically, the disentangle model 404 may receive conversation messages 402 from a conversation platform, e.g., messages from a certain channel for a given time period, and/or the like. In some embodiments, the conversation messages may be pre-arranged in the form of multiple threads. For example, the pre-arranged thread may be contained a thread of conversations from a real-time conversation window.

In another embodiment, the conversation messages may be raw messages posted on a conversation platform by different users. In this case, the disentanglement model 404 may disentangle the conversation messages into a plurality of threads, e.g., 405a-c. For example, the disentanglement model may be a neural model that has been trained with historical conversation threads. It is noted that the three threads 405a-c are for illustrative purpose only, and the output threads from the disentanglement model 404 may comprise any number of threads (e.g., five, six, seven, etc.).

Each of the disentangled thread of conversation messages may then be input to the summarization model 410. For example, a thread of conversation messages may be concatenated to form an input sequence for the summarization model 410, which may be a neural model trained as an abstractive or a generative summarization model. The summarization model 410 may generate a summary 416a-c for each of the threads 405a-c, respectively.

Figure 5:
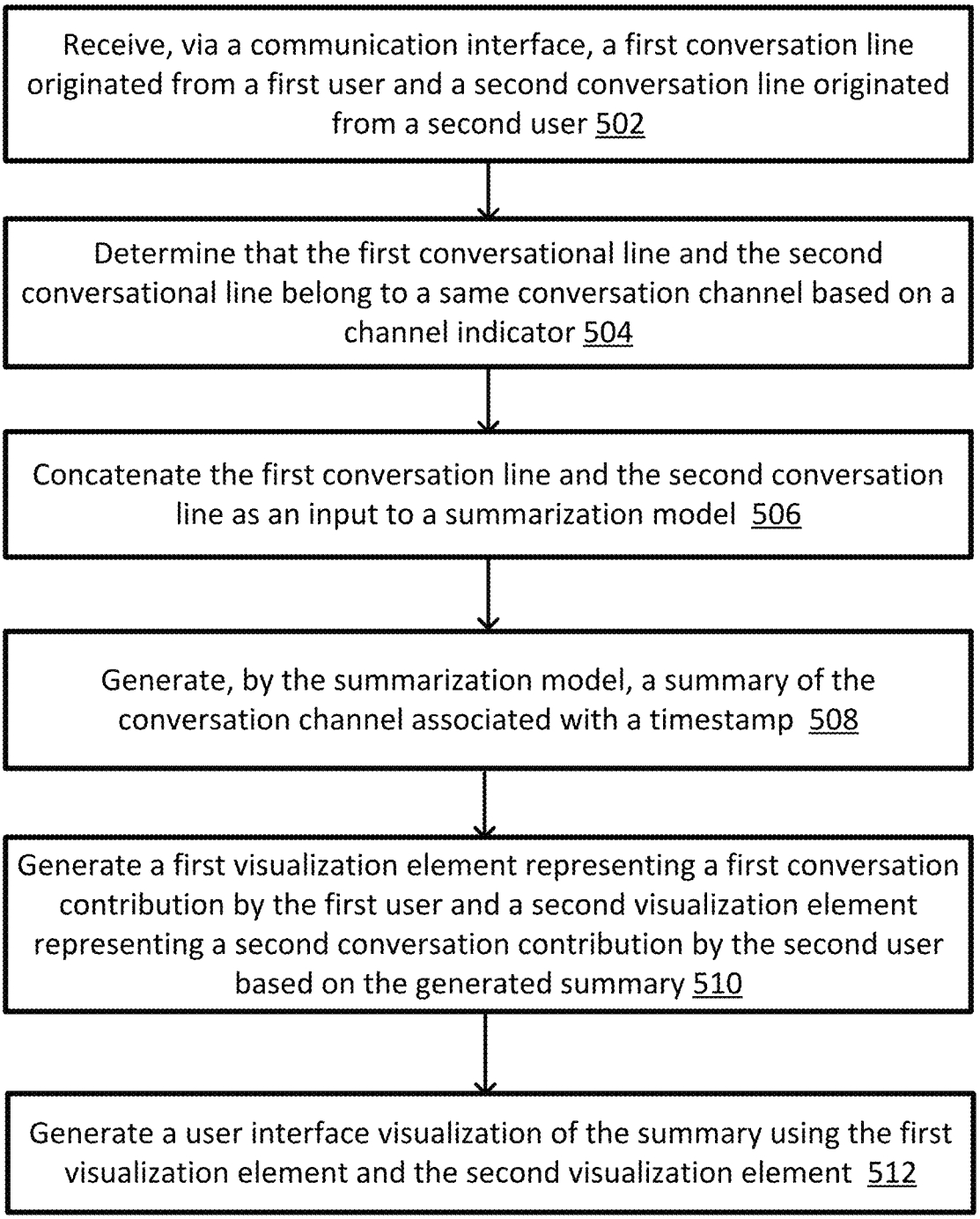
FIG. 5 is a simplified logic flow diagram illustrating a method of contextual conversation summarization in a conversation platform, according to some embodiments.

FIG. 5 is a simplified logic flow diagram illustrating a method of contextual conversation summarization in a conversation platform, according to some embodiments. The example method 500 including processes 502-512 may be implemented, at least in part, in the form of executable code stored on non-transitory, tangible, machine-readable media that when run by one or more processors may cause the one or more processors to perform one or more of the processes 502-512. In some embodiments, these processes may correspond to the method used by the conversation analytics module 330 to perform contextual conversation summarization in a conversation platform.

At process 502, conversation lines generated by different users, e.g., a first conversation line originated from a first user and a second conversation line originated from a second user, are received, via a communication interface. For example, the conversation line may take any form of a real-time conversation in a chat window, a message posted on a bulletin board, and/or the like.

At process 504, the system may determine that the first conversational line and the second conversational line belong to a same conversation channel based on a channel indicator. For example, the system may parse metadata associated with the conversation lines, such as a channel ID, a source ID, and/or the like.

At process 506, the system may concatenate the first conversation line and the second conversation line as an input to a summarization model. In one implementation, the system may further extract a text from an image presented in the conversation lines and incorporate the text into the input to the summarization model.

At process 508, the summarization model may generate a summary of the conversation channel associated with a timestamp. For example, the timestamp may indicate the summary of the conversation channel is based on messages of a certain date, a certain time period, and/or the like. In one embodiment, to generate the summary, a first name of the first user and a second name of the second user may be identified from the conversation lines. The summarization model may then be trained to generate a summary narrative in a format that references the first name or the second user as subjects of sentences. In this way, instead of just abstracting key terms from the conversation messages, a summary in a narrative form may be generated. The example summary 602 in FIG. 6A states a narrative that mentions a user "Sunday Parker" performing certain activities, e.g., "shared various ways to get involved."

In some embodiments, the system may generate different versions of summaries according to personal preferences of users. For example, the user preference may be specified by each user by configuring their own preference parameters, or may be determined based on user feedback, or the role of the user in a chat group.

At process 510, a first visualization element representing a first conversation contribution by the first user and a second visualization element representing a second conversation contribution by the second user may be generated based on the generated summary.

At process 512, a user interface visualization of the summary may be generated using the first visualization element and the second visualization element. Example user interface elements may be shown in FIGS. 6A-12 below.

Some examples of computing devices, such as computing device 300, may include non-transitory, tangible, machine readable media that include executable code that when run by one or more processors (e.g., processor 310) may cause the one or more processors to perform the processes of method 500. Some common forms of machine readable media that may include the processes and sub-processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Example Conversation Visualization

Figure 6A:
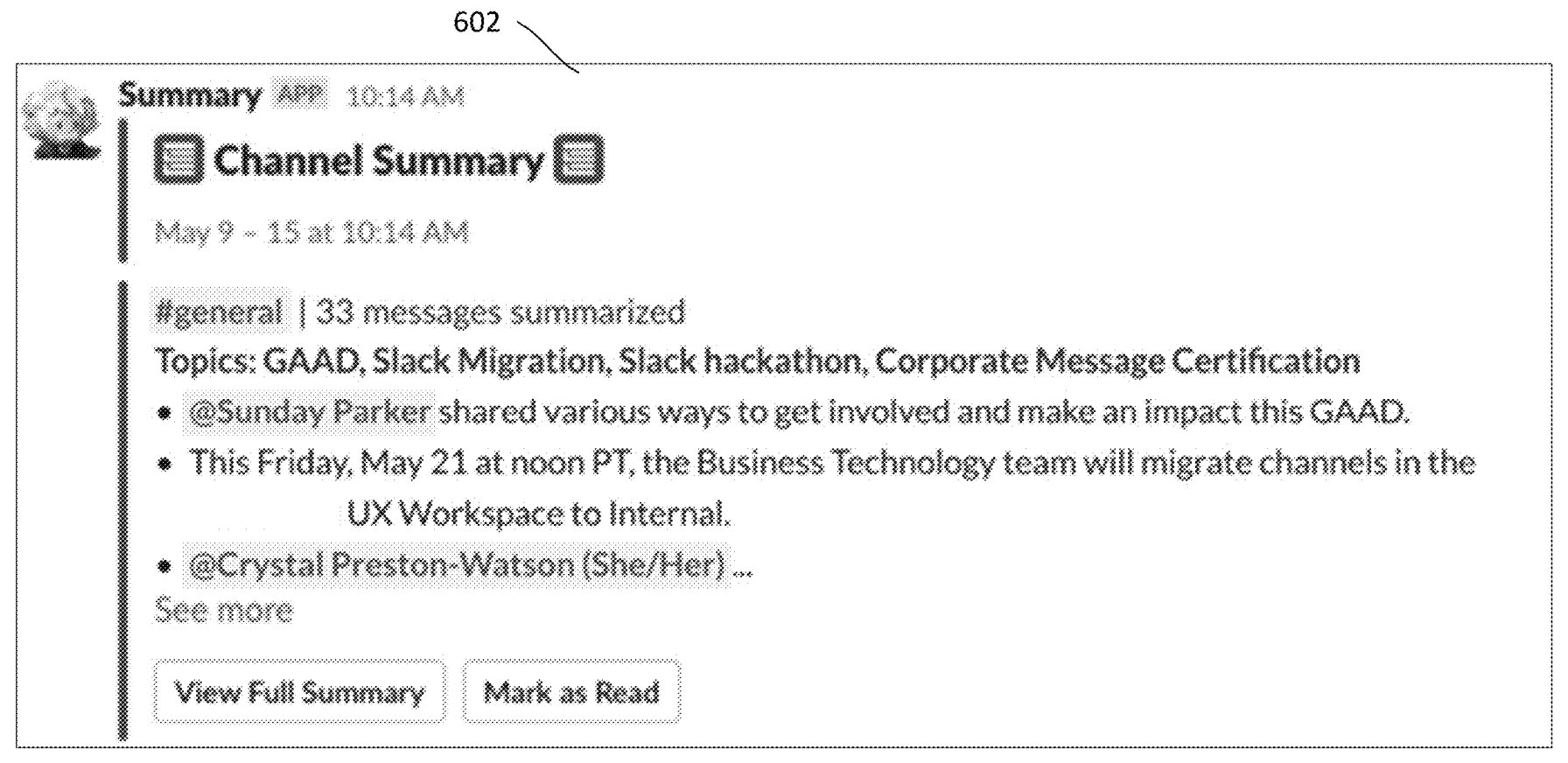
Figure 6B:
Figure 6C:
Figure 6D:
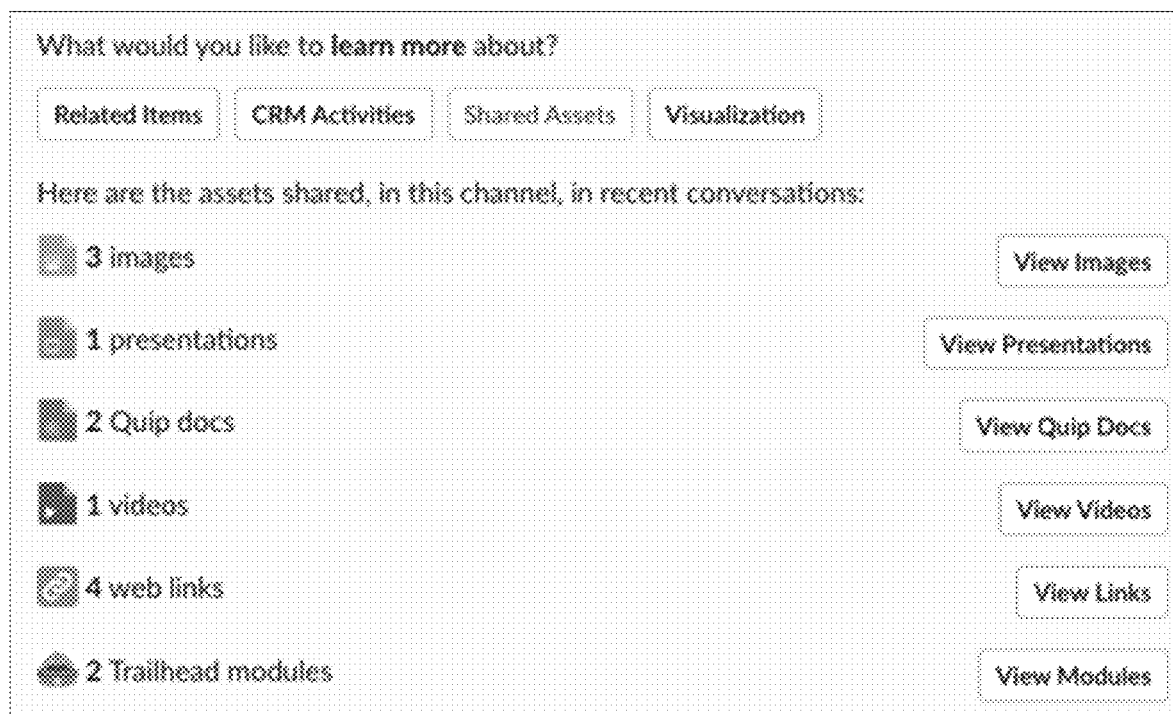

FIGS. 6A-6E are simplified diagrams illustrating example user interface widgets for providing visualized conversation summaries, according to some embodiments. FIG. 6A shows an example summary 602 of a conversation channel that summarizes messages during a certain time period, e.g., "May 9-15." FIG. 6B provides example options for a user to view different type of summaries of a conversation channel. For example, under the option "related items," a user may elect to view related channels, experts of the subject matter, and/or trail head modules. FIG. 6C shows an example view under the option "CRM activities," which provide a list of CRM activities related to the respective channel. FIG. 6D provides an example view under the option "shared assets," which shows different assets shared on the channel, such as "images," "presentations," "documents," "videos," "web links," and/or the like.

Figure 6E:
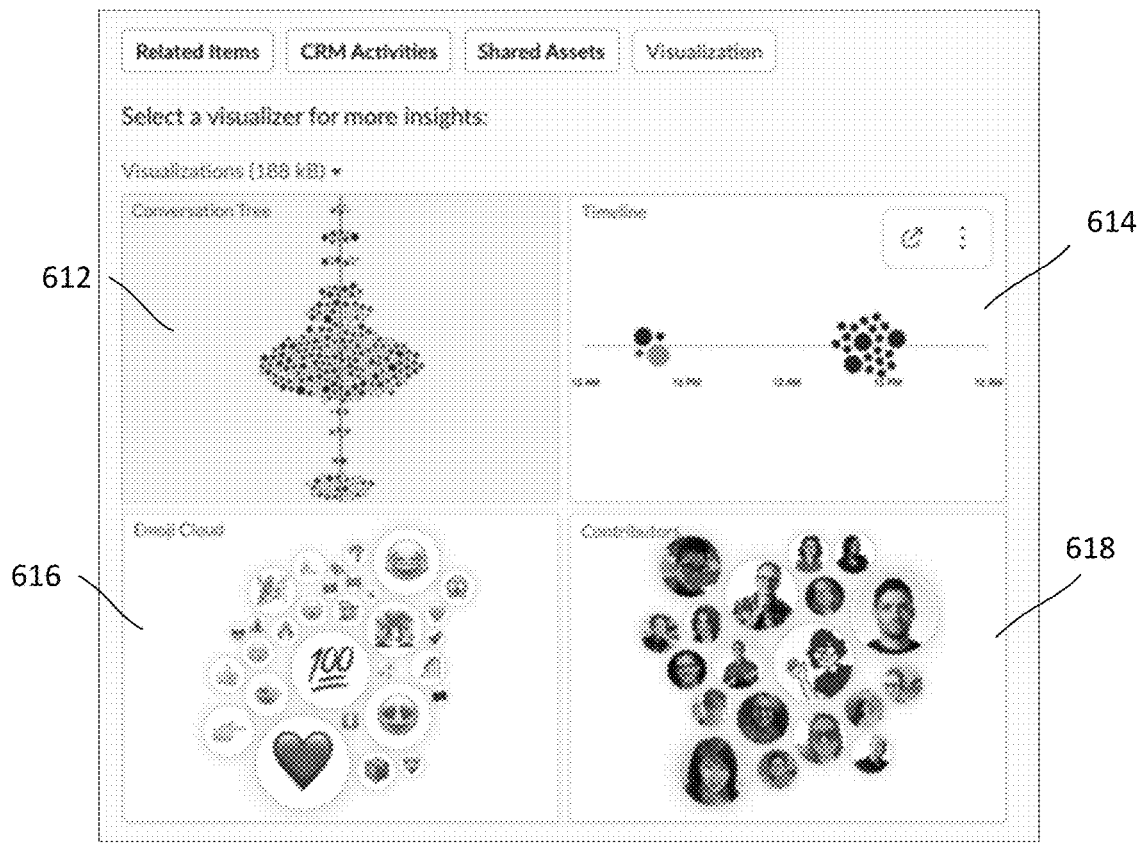

FIG. 6E shows an example view under the option "visualization," which shows a user interface for a user to select a visualizer for presenting the summary of a conversation channel. For example, the visualizer may take the form as a conversation tree, a timeline, an emoji cloud and/or contributors. The summary visualization element may choose different visual indicators to represent a summary generated relating to the first contribution of the first user to the conversation channel. In one implementation, a conversation tree structure 612 may be generated with at least one leaf node representing a first visualization element indicating a contribution from a first user, and another leaf node representing the second visualization element indicating a contribution from a second user, and at least one branch illustrating a distribution of the first visualization element or the second visualization element over time. As shown at structure 612, the size and the color of each node may represent the number of responses and/or messages generated by a certain user. Different color of the nodes may represent responses generated by different users.

In another implementation, a timeline structure 614 may be generated as distributed cluster of nodes representing responses and/or messages along a time axis. In another implementation, the emoji cloud 616 may be extracted from conversation messages to be summarized, comprising emojis that have been used in the messages, which represent sentiments of the messages. In another implementation, a cluster of user (contributor) icons 618 may be presented, representing a distribution of user contribution. For example, the size of the user icon may relate to the volume and/or number of responses or messages the user has contributed to the conversation.

Figure 7A:
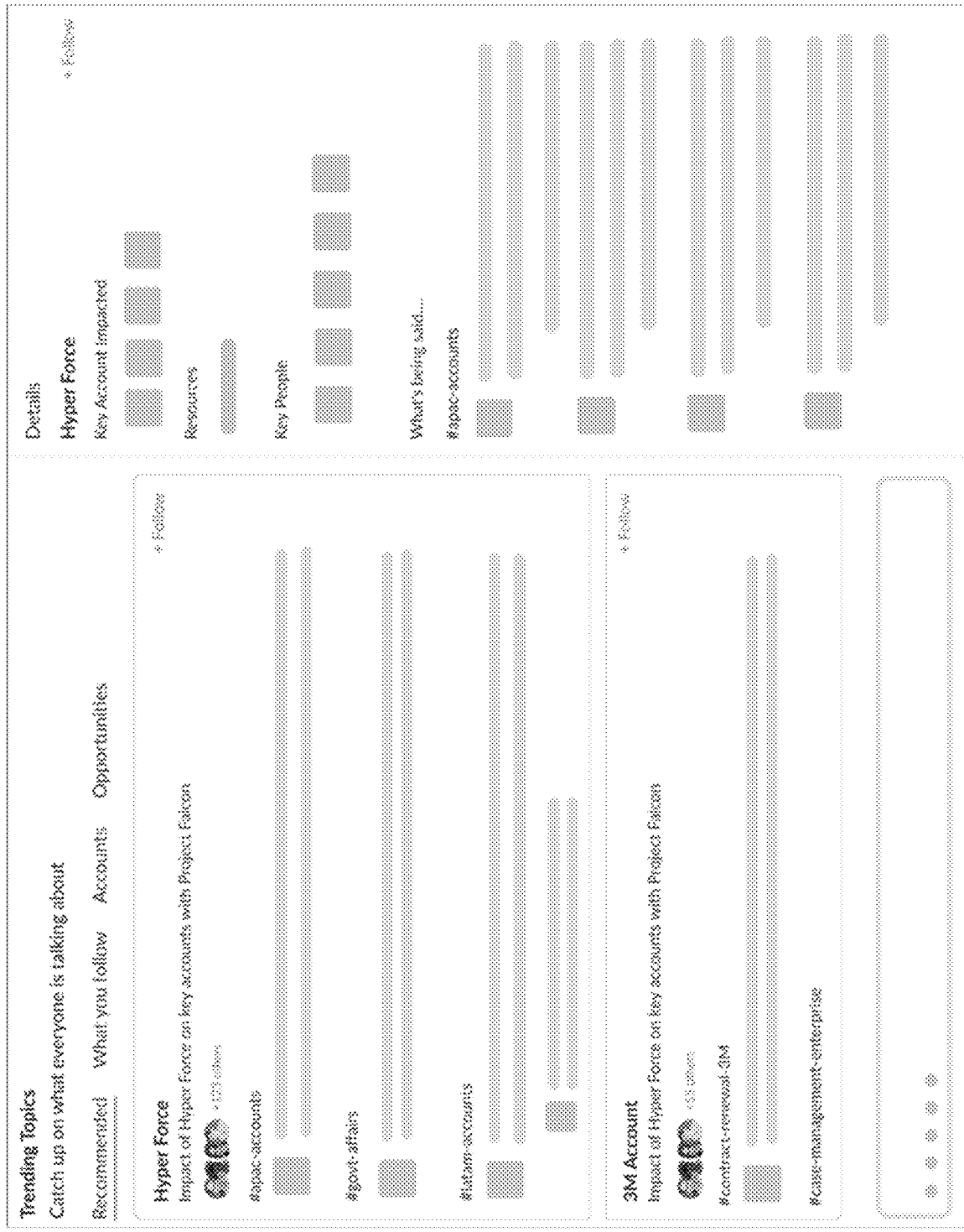
FIGS. 7A-7B are simplified diagrams illustrating example user interfaces for providing summarized topics of conversations, according to some embodiments.
Figure 7B:
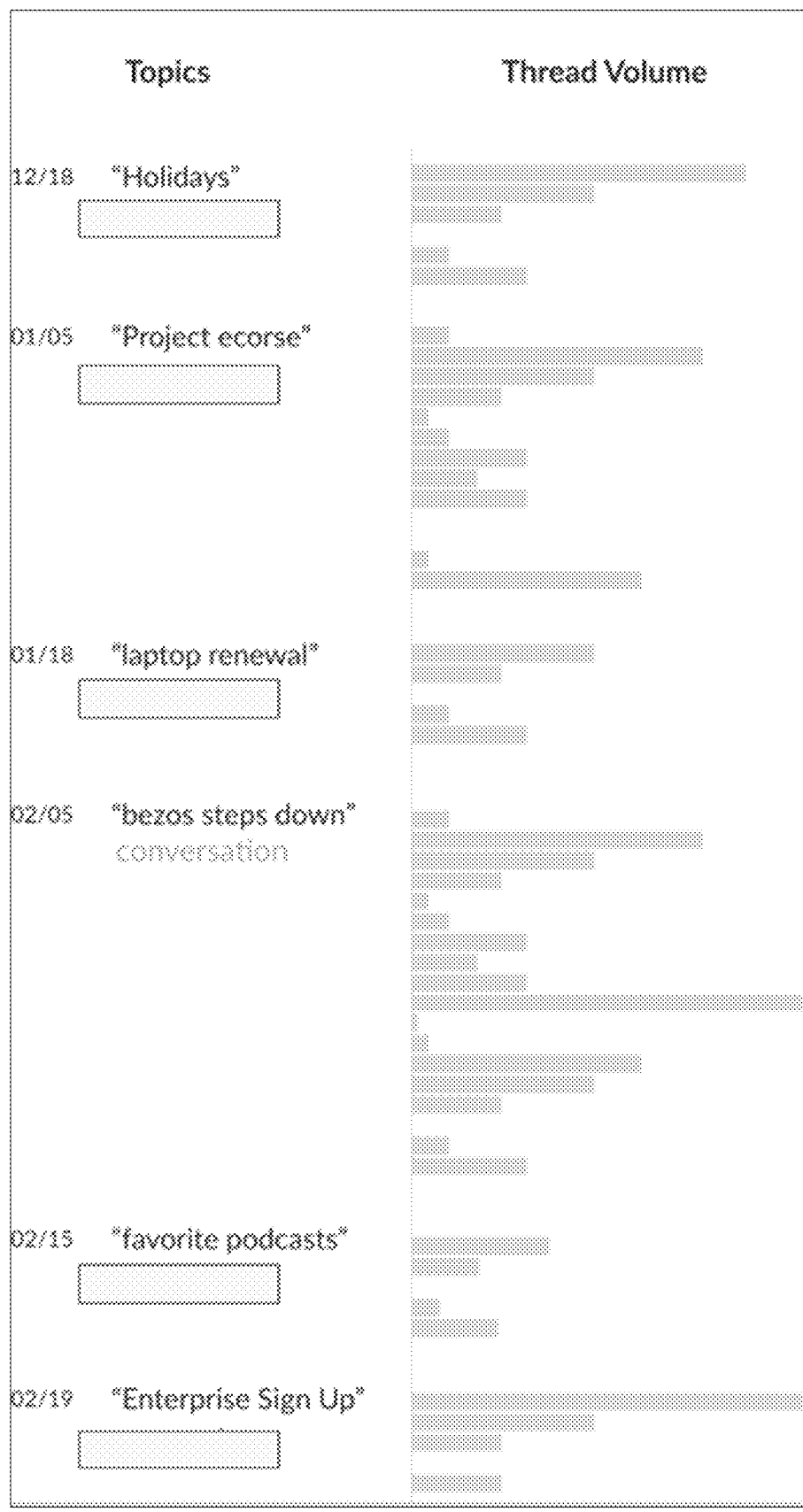

FIGS. 7A-7B are simplified diagrams illustrating example user interfaces for providing summarized topics of conversations, according to some embodiments. For example, FIG. 7A shows a dashboard listing the trending topics in the conversations. One or more topics of the conversation channel may be generated based on the conversation messages, and the one or more topics may be presented accompanying relevant contributors on a dashboard user interface. FIG. 7B shows the trending topics along a time axis, and for each trending topic, the corresponding thread volume over time.

Figure 8A:
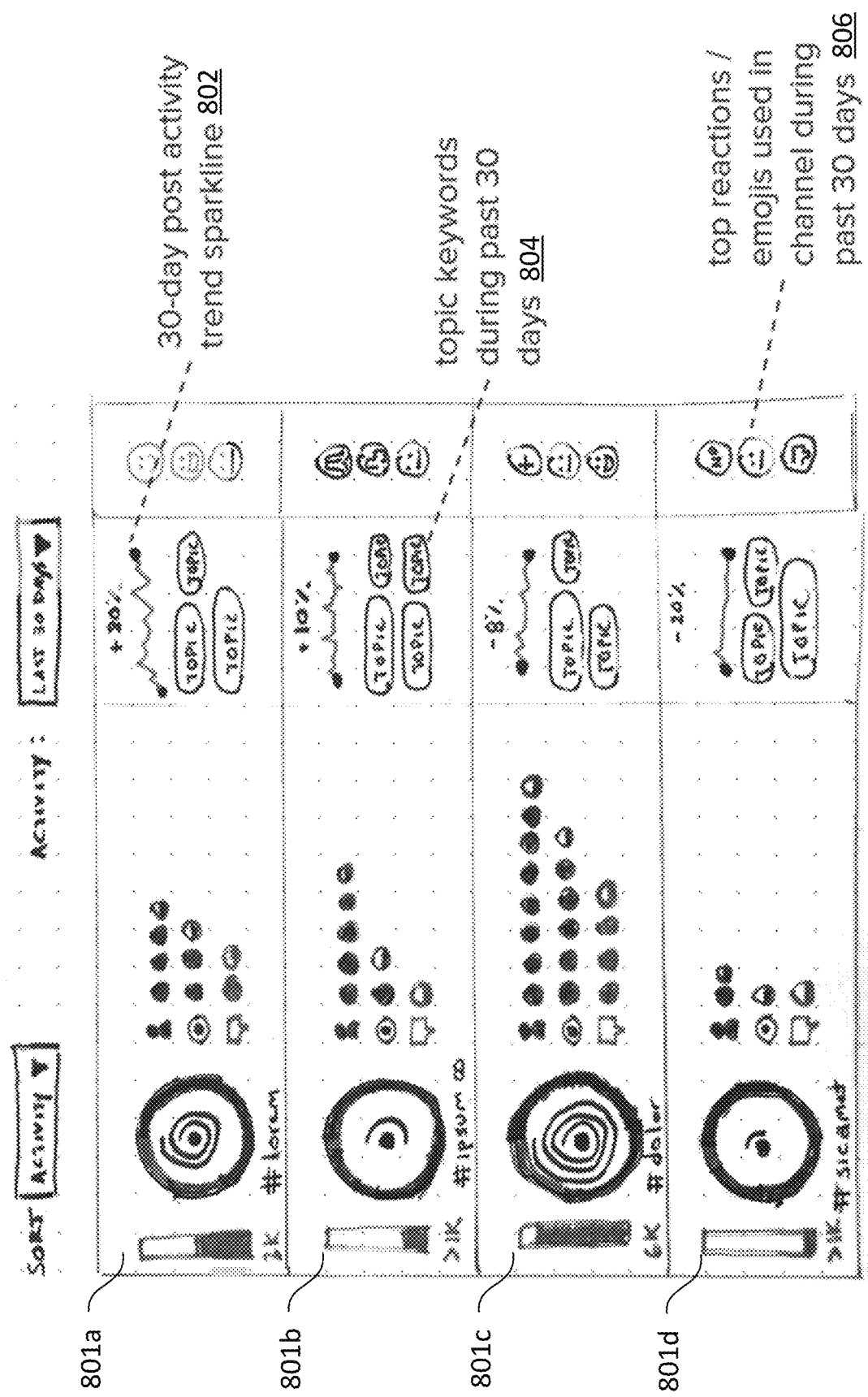
FIGS. 8A-8B are simplified diagrams illustrating example user interface widgets for providing a dashboard overview of conversation analytics on a channel on the conversation platform, according to some embodiments.
Figure 8B:
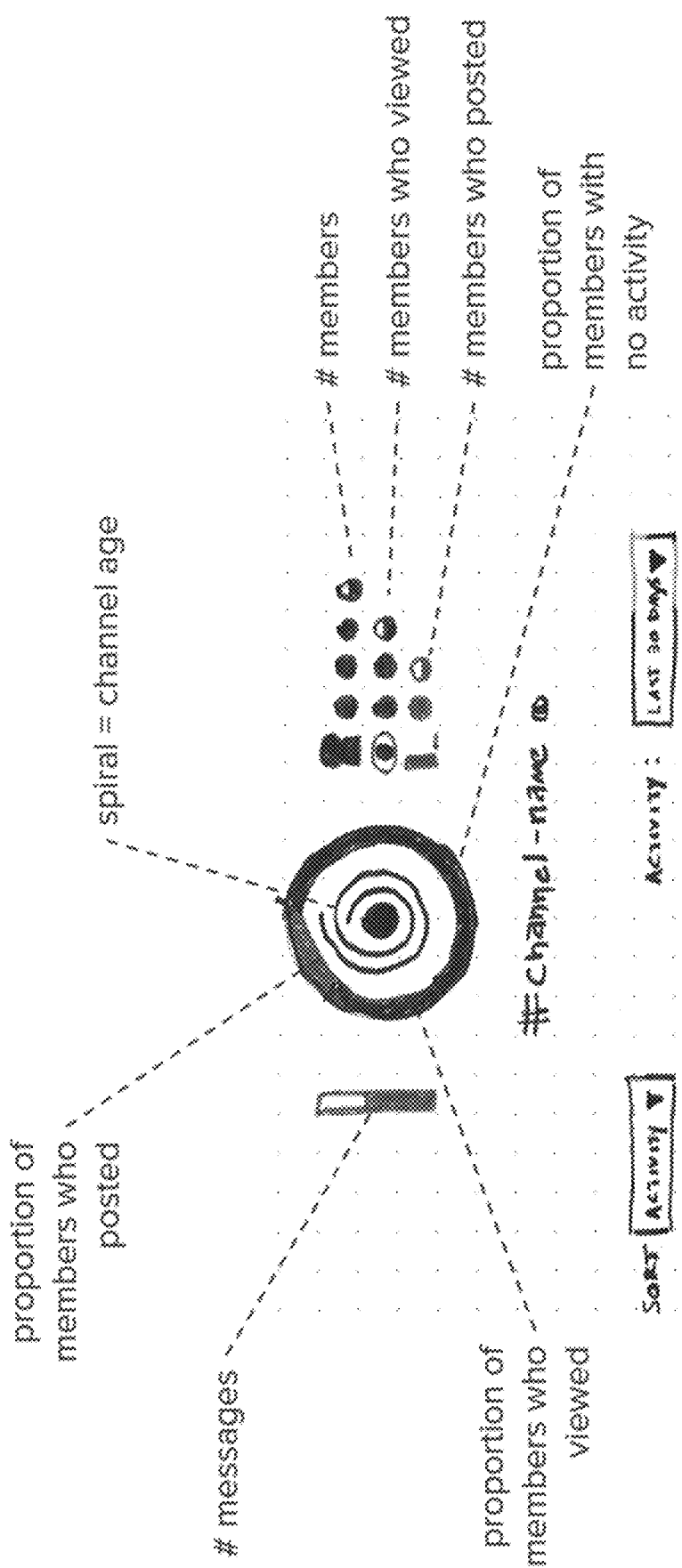

FIGS. 8A-8B are simplified diagrams illustrating example user interface widgets for providing a dashboard overview of conversation analytics on a channel on the conversation platform, according to some embodiments. For example, FIG. 8A shows a list of conversation channels, and the corresponding analytics 801*a-d*. The details of the channel analytics may be presented in FIG. 8B, showing various visualization elements such as a pie chart, showing proportion of members who posted/viewed and proportion of members who has no activity, a spiral element showing the channel age, and/or the like. For each conversation channel, visualization elements such as a 30-day post activity trend sparkline 802, topic keywords during past 30 days 804, top reactions and/or emojis used in the channel during the past 30 days 806 may be presented to illustrate summary analytics of conversation messages on the channel.

Figure 9:
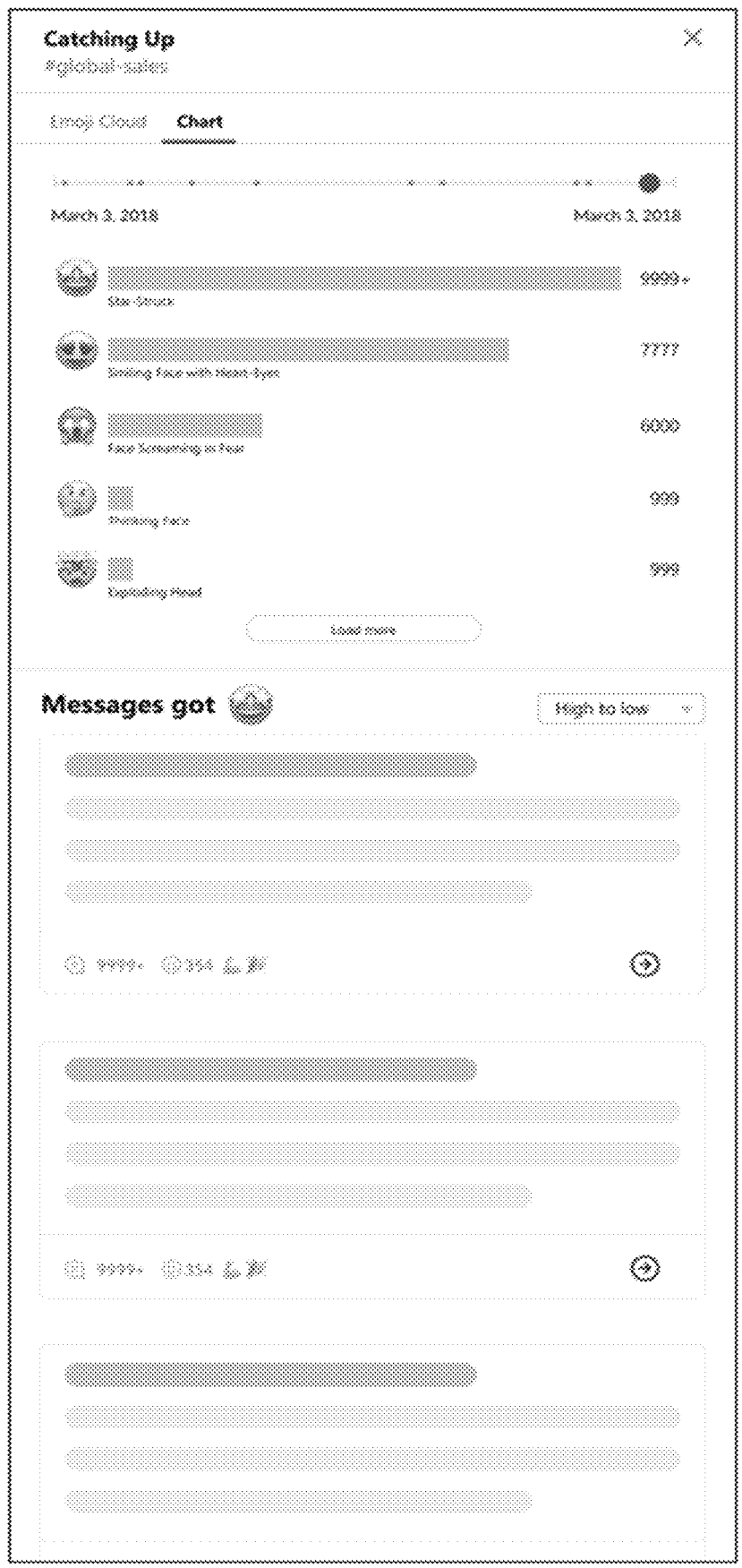
FIG. 9 is a simplified diagram illustrating an example interface providing a summary of conversation analytics, according to some embodiments.

FIG. 9 is a simplified diagram illustrating an example interface providing a summary of conversation analytics, according to some embodiments. For example, statistics of emoji usage in the conversation may be analyzed to show the sentiments of the conversation.

Figure 10:
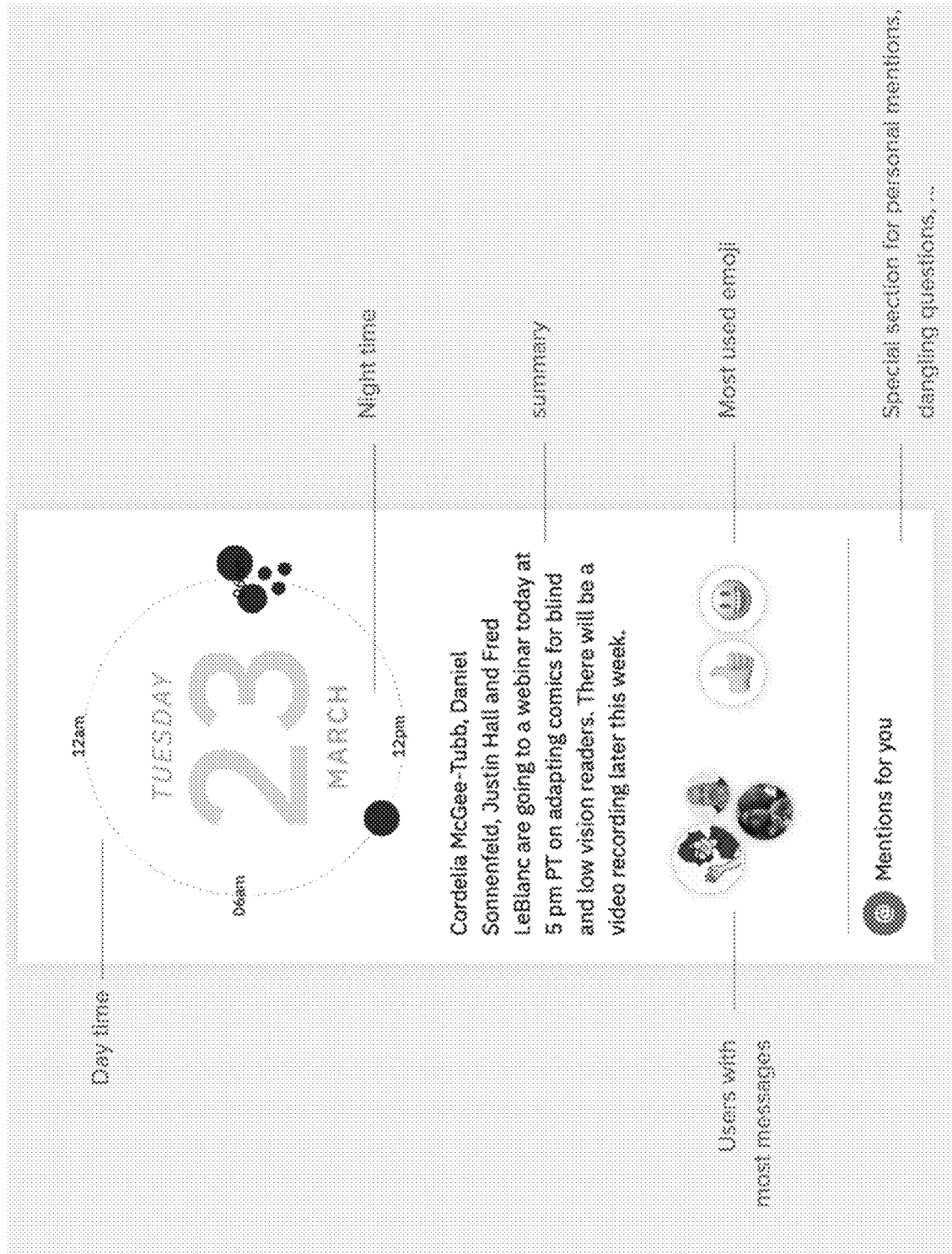
FIG. 10 is a simplified diagram illustrating an example interface providing a personalized summary of daily conversation analytics, according to some embodiments.

FIG. 10 is a simplified diagram illustrating an example interface providing a personalized summary of daily conversation analytics, according to some embodiments. An example personalized daily conversation channel summary is presented, showing a summary of the conversation messages during the past 24 hours, and/or special mentions relating to the user, and/or the like.

Figure 11:
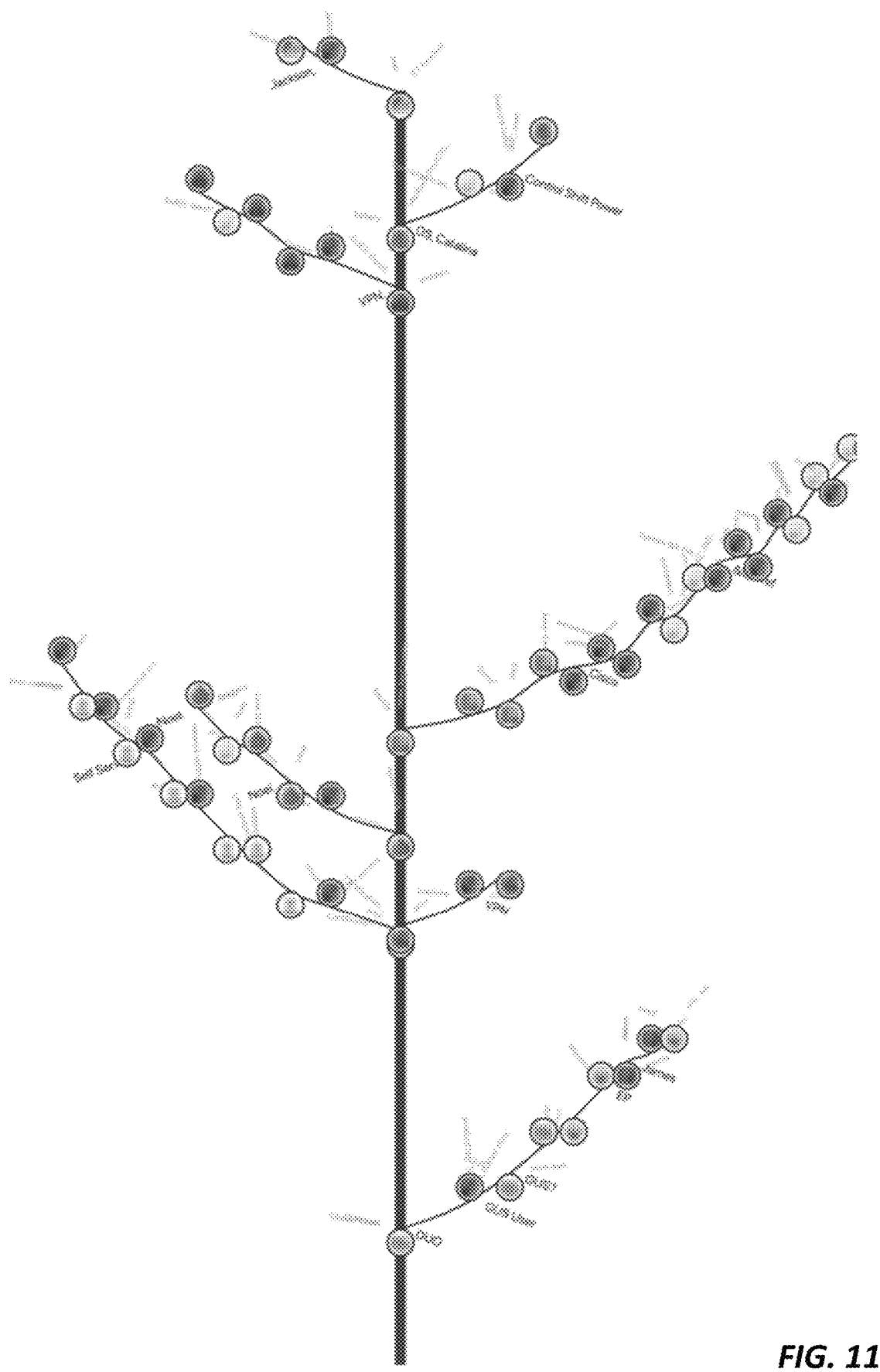
FIG. 11 is a simplified diagram illustrating an example tree structure visualizing conversations on a channel of an online platform, according to some embodiments.

FIG. 11 is a simplified diagram illustrating an example tree structure visualizing conversation on a channel of an online platform, according to some embodiments. For example, FIG. 11 shows a tree structure having various nodes representing the number or volume of activities of different users (in different colors). Different branches of the tree may represent different threads of conversations on the channel. The size and the shades of each node may represent the number of responses and/or messages generated by a certain user.

Figure 12:
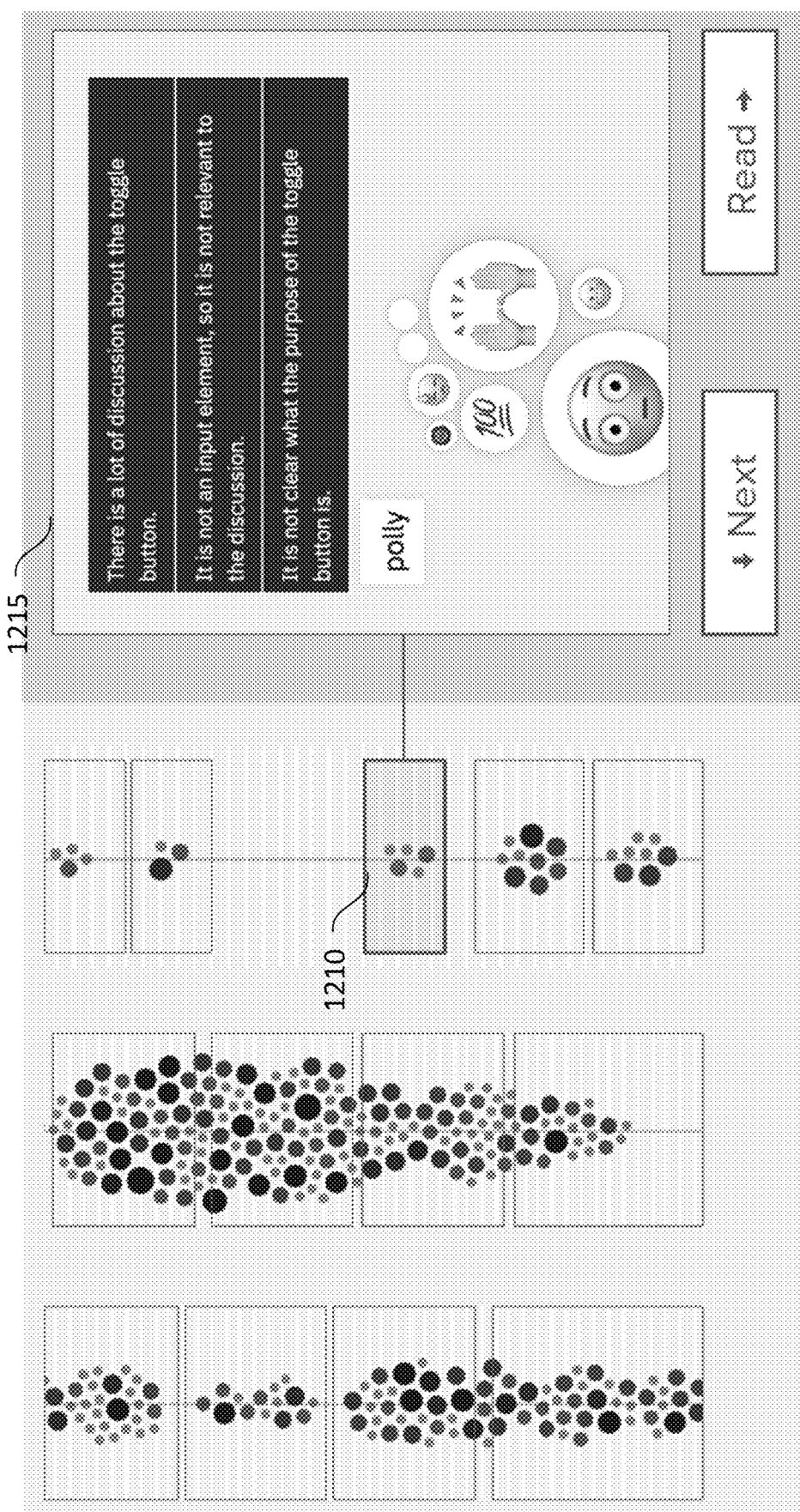
FIG. 12 is a simplified diagram illustrating an example user interface for a user to review conversation summaries via the tree structure visualization shown in FIG. 11, according to some embodiments.

FIG. 12 is a simplified diagram illustrating an example user interface for a user to review conversation summaries via the tree structure visualization shown in FIG. 11, according to some embodiments. In one implementation, the conversation summary on a channel may be represented by a tree structure discussed in relation to 612 in FIG. 6E. A user may choose to engage with a selection window 1210 to select a section of the conversation tree, which may present a blow-up window 1215 providing details of the summarized section. For example, in the window 1215, a summary of the conversation messages that correspond to the selected window 1210 may be provided, together with an emoji cloud, and/or any topic keywords.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method of contextual conversation summarization in a conversation platform, the method comprising:
   receiving, via a communication interface, a first conversation line originated from a first user and a second conversation line originated from a second user;
   determining that the first conversational line and the second conversational line belong to a same conversation channel based on a channel indicator;
   concatenating the first conversation line and the second conversation line as an input to a summarization model;
   generating, by the summarization model, a summary of the conversation channel associated with a timestamp;
   generating a first visualization element representing a first contribution to the summary that is made by the first user and a second visualization element representing a second contribution to the summary that is made by the second user based on the generated summary, a size of the first visualization element varying with respect to a number of messages generated by only the first user, and a size of the second visualization element varying with respect to a number of messages generated by only the second user;
   presenting, via a user interface, the first visualization element and the second visualization element in a visualization structure;
   receiving, via the user interface, a user selection of one of the first visualization element or the second visualization element; and presenting, via the user interface, in response to the user selection, a user interface element extended from the visualization structure that displays at least a part of the summary corresponding to the respective conversation line corresponding to the one of the first visualization element or the second visualization element;

wherein the visualization structure comprises a tree structure;

wherein the first visualization element and the second visualization element are presented as leaf nodes extending from a branch of the tree structure;

wherein branches of the tree structure illustrate the distribution of the first visualization element or the second visualization element over time, and wherein different branches of the tree structure represent different threads of the conversation.

2. The method of claim 1, wherein the summary of the conversation is generated by:

identifying a first name of the first user and a second name of the second user from the conversation lines; and training the summarization model to generate a summary narrative in a format that references the first name or the second user as subjects of sentences.

3. The method of claim 1, further comprising:

extracting a text from an image presented in the first conversation line; and incorporating the text into the input to the summarization model.

4. The method of claim 1, further comprising:

generating a first summary of the conversation channel based on the input according to a first set of preference parameters for the first user; and generating a second summary of the conversation channel based on the input according to a second set of preference parameters for the second user, wherein the first set of preference parameters or the second set of preference parameters are determined based on previous user feedback.

5. The method of claim 1, further comprising:

generating one or more topics of the conversation channel based on the first conversation line and the second conversation line; and presenting the one or more topics accompanying relevant contributors on a dashboard user interface.

6. The method of claim 1, wherein the first visualization element further represents a first summary generated relating to the first contribution of the first user to the conversation channel.

7. The method of claim 1, wherein the generating of the visualization structure further comprises generating a timeline structure having the first visualization element or the second visualization element distributed along a timeline.

8. The method of claim 1, wherein the generating of the visualization structure further comprises generating a cluster of emojis extracted from the first conversation line and the second conversation line, and wherein the method further comprises:

presenting, in the user interface element extended from the visualization structure, the cluster of emojis.

9. The method of claim 1 wherein the first visualization element includes a first user icon of the first user and the second visualization element includes a second user icon of the second user.

10. The method of claim 1, wherein:

the user interface element comprises a sub-element configured to receive a second user selection of the other one of the first visualization element and the second visualization element; and presenting, via the user interface, in response to the second user selection, the user interface element extended from the visualization structure that displays at least a part of the summary corresponding to the respective conversation line corresponding to the other one of the first visualization element or the second visualization element.

11. The method of claim 1, wherein the first visualization element and the second visualization element are in a same branch of the visualization structure.

12. A system of contextual conversation summarization in a conversation platform, the system comprising:

a communication interface receiving a first conversation line originated from a first user and a second conversation line originated from a second user;

a memory storing a plurality of processor-readable instructions; and a processor executing the plurality of processor-readable instructions to perform operations comprising:

determining that the first conversational line and the second conversational line belong to a same conversation channel based on a channel indicator;

concatenating the first conversation line and the second conversation line as an input to a summarization model;

generating, by the summarization model, a summary of the conversation channel associated with a timestamp;

generating a first visualization element representing a first contribution to the summary that is made by the first user and a second visualization element representing a second contribution to the summary that is made by the second user based on the generated summary, a size of the first visualization element varying with respect to a number of messages generated by only the first user, and a size of the second visualization element varying with respect to a number of messages generated by only the second user;

presenting, via a user interface, the first visualization element and the second visualization element in a visualization structure;

receiving, via the user interface, a user selection of one of the first visualization element or the second visualization element; and presenting, via the user interface, in response to the user selection, a user interface element extended from the visualization structure that displays at least a part of the summary corresponding to the respective conversation line corresponding to one of the first visualization element or the second visualization element;

wherein the visualization structure comprises a tree structure;

wherein the first visualization element and the second visualization element are presented as leaf nodes extending from a branch of the tree structure;

wherein branches of the tree structure illustrate the distribution of the first visualization element or the second visualization element over time, and wherein different branches of the tree structure represent different threads of the conversation.

13. The system of claim 12, wherein the summary of the conversation is generated by:
 identifying a first name of the first user and a second name of the second user from the conversation lines; and
 training the summarization model to generate a summary narrative in a format that references the first name or the second user as subjects of sentences.

14. The system of claim 12, wherein the operations further comprise:
 extracting a text from an image presented in the first conversation line; and
 incorporating the text into the input to the summarization model.

15. The system of claim 12, wherein the operations further comprise:
 generating a first summary of the conversation channel based on the input according to a first set of preference parameters for the first user; and
 generating a second summary of the conversation channel based on the input according to a second set of preference parameters for the second user,
  wherein the first set of preference parameters or the second set of preference parameters are determined based on previous user feedback.

16. The system of claim 12, wherein the operations further comprise:
 generating one or more topics of the conversation channel based on the first conversation line and the second conversation line; and
 presenting the one or more topics accompanying relevant contributors on a dashboard user interface.

17. The system of claim 12, wherein the first visualization element further represents a first summary generated relating to the first contribution of the first user to the conversation channel.

18. The system of claim 12, wherein an operation of generating the visualization structure further comprises generating a cluster of emojis extracted from the first conversation line and the second conversation line, and wherein the operations further comprise: presenting, in the user interface element extended from the visualization structure, the cluster of emojis.

19. A processor-readable non-transitory storage medium storing processor-executable instructions of contextual conversation summarization in a conversation platform, the instructions being executed by a processor to perform operations comprising:
 receiving, via a communication interface, a first conversation line originated from a first user and a second conversation line originated from a second user;
 determining that the first conversational line and the second conversational line belong to a same conversation channel based on a channel indicator;
 concatenating the first conversation line and the second conversation line as an input to a summarization model;
 generating, by the summarization model, a summary of the conversation channel associated with a timestamp;
 generating a first visualization element representing a first contribution to the summary that is made by the first user and a second visualization element representing a second contribution to the summary that is made by the second user based on the generated summary, a size of the first visualization element varying with respect to a number of messages generated by only the first user, and a size of the second visualization element varying with respect to a number of messages generated by only the second user;
 presenting, via a user interface, the first visualization element and the second visualization element in a visualization structure;
 receiving, via the user interface, a user selection of one of the first visualization element or the second visualization element; and
 presenting, via the user interface, in response to the user selection, a user interface element extended from the visualization structure that displays at least a part of the summary corresponding to the respective conversation line corresponding to the one of the first visualization element or the second visualization element;
 wherein the visualization structure comprises a tree structure;
 wherein the first visualization element and the second visualization element are presented as leaf nodes extending from a branch of the tree structure;
 wherein branches of the tree structure illustrate the distribution of the first visualization element or the second visualization element over time, and
 wherein different branches of the tree structure represent different threads of the conversation.

\* \* \* \* \*